May 25, 1965   W. H. AMENT   3,185,406
REEL BRAKE
Original Filed Feb. 28, 1961   3 Sheets-Sheet 1

INVENTOR.
WESTON H. AMENT
BY Julean Caplan
attorney

May 25, 1965  W. H. AMENT  3,185,406
REEL BRAKE
Original Filed Feb. 28, 1961  3 Sheets-Sheet 2
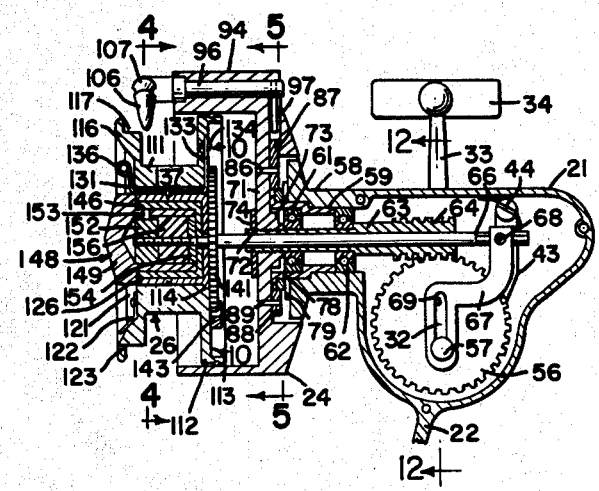
Fig. 3.
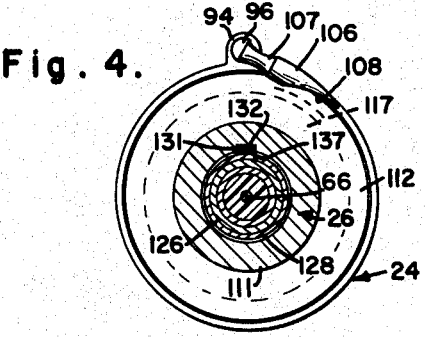
Fig. 4.
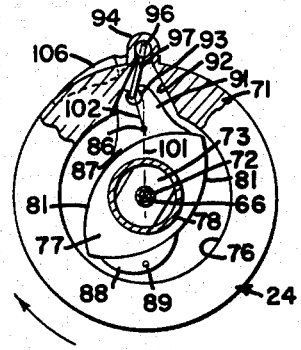
Fig. 5.
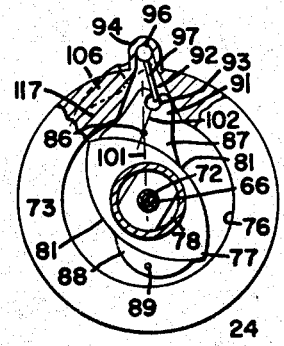
Fig. 6.
Fig. 7.
INVENTOR.
WESTON H. AMENT
BY Julian Caplan
attorney May 25, 1965 W. H. AMENT 3,185,406

REEL BRAKE

Original Filed Feb. 28, 1961 3 Sheets-Sheet 3

INVENTOR.
WESTON H. AMENT
BY Julian Caplan
attorney

United States Patent Office 3,185,406
Patented May 25, 1965

3,185,406
REEL BRAKE
Weston H. Ament, 2114 Greenwys Drive,
Redwood City, Calif.
Original application Feb. 28, 1961, Ser. No. 92,244, now Patent No. 3,107,876, dated Oct. 22, 1963. Divided and this application Dec. 26, 1962, Ser. No. 247,392
2 Claims. (Cl. 242—84.5)

This application is a division of applicant's application Serial No. 92,244, filed February 28, 1961, now Patent No. 3,107,876.

This invention relates to a new and improved spinning reel brake.

An important feature of the invention is the fact that the spool is readily attached and detached from the reel body and, further, that the brake adjustment and spool are so inter-related that the brake may be left on the reel when the spool is removed. The latter feature has the additional advantage that the brake adjustment need not be changed when the spool is removed.

Another feature of the invention involves the construction of the brake which exerts a drag on the line. The line spool is free of the brake and hence changes and adjustments of the brake and spool may be accomplished without interfering with the other members.

Other objects of the present invention will become apparent upon reading the following specification and referring to the accompanying drawings in which similar characters of reference represent corresponding parts in each of the several views.

In the drawings:

FIG. 3 is a longitudinal vertical sectional view taken substantially along the line 3—3 of FIG. 2.

FIG. 4 is a transverse vertical sectional view taken substantially along the line 4—4 of FIG. 3.

FIG. 5 is a transverse vertical sectional view taken substantially along the line 5—5 of FIG. 3.

FIG. 6 is a view similar to FIG. 5, showing the position of the cam in closed position, whereas in FIG. 5 the cams are in open position.

FIG. 7 is an exploded perspective view of the cam and cam followers.

Figure 1:
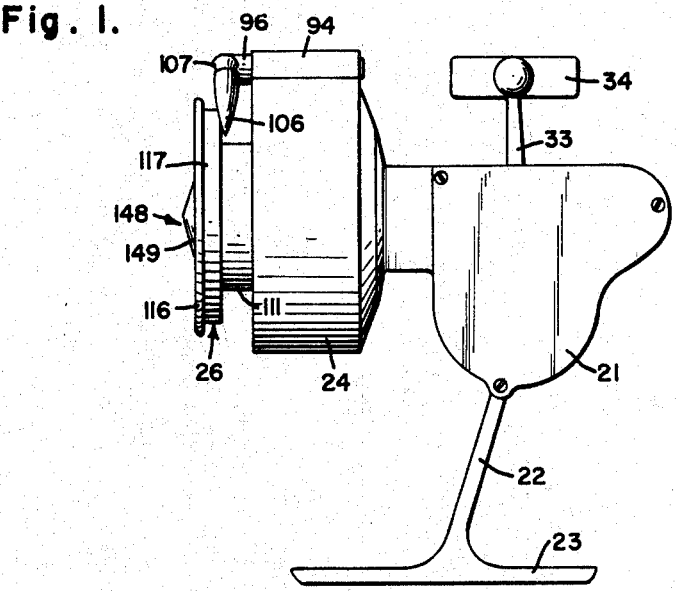
FIG. 1 is a side elevational view of the reel shown in inverted position.
Figure 2:
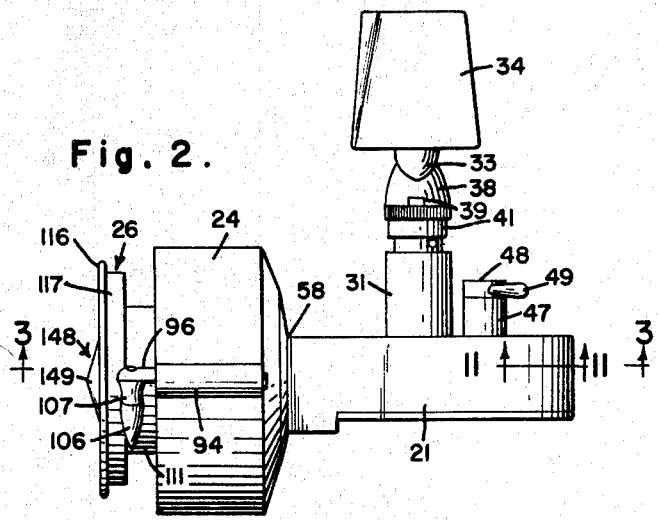
FIG. 2 is a plan view thereof.
Figure 8:
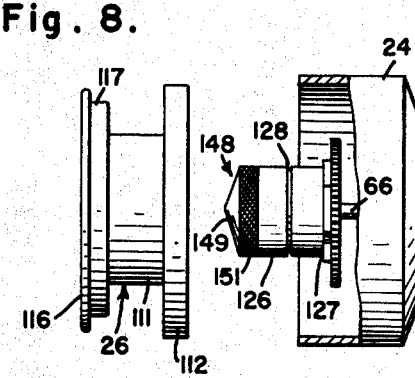
FIG. 8 is an exploded side elevational view partly broken away of the spool, brake, spool cup and associated parts.
Figure 9:
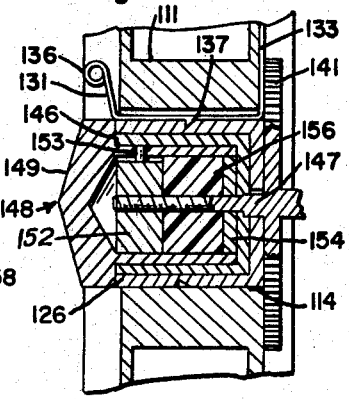
FIG. 9 is an enlarged fragmentary sectional view of a portion of FIG. 3.
Figure 10:
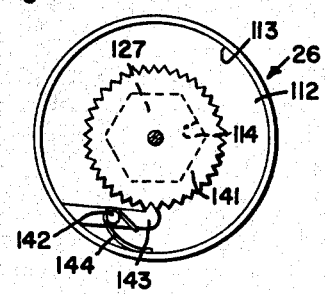
FIG. 10 is a fragmentary view of the drag click gear and associated structure.
Figure 11:
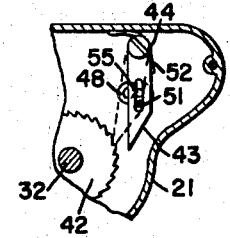
FIG. 11 is a fragmentary sectional view taken substantially along the line 11—11 of FIG. 2.
Figure 12:
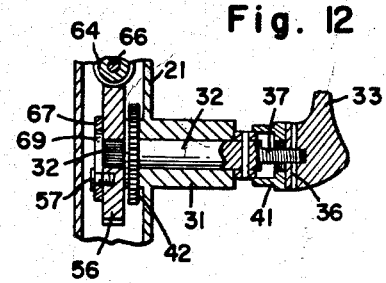
FIG. 12 is a fragmentary sectional view taken substantially along the line 12—12 of FIG. 3.

The present invention concerns a spinning reel of the type having a normally non-rotating open spool. Such a reel is attached to a rod in the position inverted from that shown in FIG. 1, the rod being usually held in the right hand by the fisherman and a winding handle on the reel being controlled by the left hand. In casting the lure, the spool on which the line is wound is held stationary and projected forwardly relative to the cup which surrounds the spool. The lure (not shown) is relatively heavy and on the casting movement of the rod is projected outwardly carrying the line with it. The line strips off of the spool during the casting movement. If a fish strikes the lure, the line continues to be pulled outwardly and this action causes rotation of the spool and a resistance to such turning movement is provided by means of an adjustable brake. Further, when the lure is retrieved, the turning handle is wound so that the line is wound onto the spool. The latter two operations require that the free line be "picked-up" by means of a pick-up finger.

In more specific detail, there is provided a housing 21 attached by means of stem 22 to a concave bracket 23 which fits against the underside of the rod (not shown) and is held thereto in conventional manner well understood in this art. Forwardly of the housing 21 is a cup 24 shielding a spool 26 around which the cup 24 revolves on the retrieve. Spool 26 also shuttles longitudinally relative thereto. The line is wound about the spool 26 and is stripped therefrom and wound thereon by means hereinafter explained.

Housing 21 is provided with a laterally extending main boss 31. Within boss 31 is a winding handle shaft 32. Connected to the outer end of shaft 32 is crank 33 having rotatably mounted on the outer end thereof handle knob 34. In a preferred form of the invention, crank 33 may be folded during storage, and for such purpose crank 33 is pivotally connected by means of pin 36 to the flattened outer end 37 of shaft 32. Knob 38 on crank 33 is formed with slot 39 so that crank 33 may pivot inwardly relative to shaft 32. The outer end 37 of shaft 32 is threaded and a nut 41 engaged therewith. When the nut 41 is turned toward boss 31 there is a space between the end of nut 41 and knob 38 which permits the handle to pivot inwardly. When nut 41 is turned outwardly it engages knob 38 and forces crank 33 into operative position perpendicular to shaft 32.

The inner end of handle shaft 32 carries a ratchet 42 and inside housing 21 is a dog 43 pivoted thereto by means of pin 44. Spring 52 biases dog 43 into engagement with ratchet 42. A second boss 47 projects laterally from housing 21 and carries anti-reverse dog shaft 48. Dog shaft 48 has a lever 49 exterior of housing 21 which turns the shaft from operative to inoperative position. Dog 43 is formed with an elongated slot 51 in which fits pin 55 connected to but eccentric with respect to shaft 48. Hence by turning the anti-reverse dog lever 49 from operative to inoperative position the dog 43 is brought into engagement or disengagement relative to ratchet 42. When the dog is engaged cup 24 may be turned only in winding direction. When the lever 49 is in inoperative position cup 24 may be turned in either direction.

Inwardly of ratchet 42 on shaft 32 is a gear 56 rotatable therewith. Gear 56 also carries an eccentric shuttle pin 57. Mounted in forward bearing boss 58 of housing 21 is bearing fitting 59 which holds front bearing 61 and also spaces bearing 61 from rear bearing 62 held in boss 58. Rotatable in bearings 61, 62 is hollow spindle 63 which extends longitudinally of the reel in a direction transverse to shaft 32. The rearward end of spindle 63 is formed with a pinion 64 meshing with gear 56 so that spindle 63 turns with handle 33. Longitudinally reciprocable inside spindle 63 is shuttle rod 66. The rearward end of shuttle rod 66 is fixed to shuttle 67 by means of fitting 68. Shuttle 67 is an S-shaped member having fitting 68 at one end and an elongated slot 69 on the other end through which extends shuttle pin 57. It will thus be seen that the shuttle rod 66 is reciprocated by shuttle 67 when handle 33 is turned, and hence turning of handle 33 accomplishes both rotation of spindle 63 and reciprocation of shuttle rod 66 in timed sequence. When handle 33 is "down" or in casting position, rod 66 is forward.

Cup 24 has a bottom plate 71 extending transversely and provided with a central threaded hole which is threaded onto the threaded forward end 72 of spindle 63 and has an abutment 73 bearing against the inner race of bearing 61 and is held by nut 74. The rearward face of plate 71 is formed with a recess 76. Within recess 76 fits cam 77 having a special configuration best shown in FIGS. 5 and 6. Cam 77 is held between a peripheral flange 78 on fitting 59 and anti-friction shim 79 bearing against boss 58. Cam 77 has two faces 81, each of which comprises a circular arc which is a function of the radius and has a radius of curvature substantially greater than that of recess 76.

Mounted in recess 76 and fixed to cup plate 71 by means of pin 86 is a cam follower 87 having an arcuate cam follower surface complementary to the arcuate face 81 of cam 77. On the side opposite of cam follower 87 is idler 88 which is attached by means of pin 89 to plate 71 and has an arcuate surface similar to surface 81. Idler 88 performs no function other than to equalize pressure on cam 77 to compensate for pressures exerted by follower 87. Follower 87 has an upward extension 91 fitting through an opening 92 in cup 24 and formed with a slot 93. On the exterior of cup 24 is a sleeve 94 through which extends longitudinal pickup shaft 96. Shaft 96 has a crank pin 97 which fits into slot 93. Hence oscillation of follower 87 causes oscillation of shaft 96.

The arrangements of the parts is such that rotation of cup 24 by reason of friction turns cam 77 about fitting 59, on which it is mounted, in the same direction as the turning of cup 24. This causes cam 77 to oscillate depending upon the direction in which handle 33 is turned. It should be emphasized that there is no direct connection between cup 24 and cam 77. Shim 79 is interposed between cam 77 and the forward face of boss 58, and hence is in frictional engagement both with boss 58 and cam 77. Cam 77 also is in frictional engagement with the shoulder at the forward edge of bearing fitting 59. Cam followers 87 and 88 are pinned to cup 24 and are oscillatable about their pins 86 and 89 within an arc limited by the throw of the cam 77. Hence, only a change in direction of rotation of cup 24 results in shifting of follower 87 and corresponding movement of finger 106.

The shape of cam 77 and follower 87 is illustrated in FIGS. 5, 6 and 7, and relationship of the parts is shown. In FIG. 5, cup 24 is rotated clockwise by turning handle 33 to casting position in normal position of use. As heretofore explained, this turning movement causes movement of cam 77 in the same clockwise direction. A line 101, connecting the center of spindle 63 and pin 86 on which cam follower 87 is mounted, passes to the right of vector 102 drawn through pin 86 and slot 93. The center of pressure on cam 77 relative to cam follower 87 is at the upper right-hand corner, as viewed in FIG. 5. This causes oscillation of cam follower 87 to the position shown. On reversal of direction of turning of handle 33, and hence of cup 24 (counter-clockwise direction), as shown in FIG. 6, cam 77 is moved in a counter-clockwise direction.

Line drawn 101 connecting the centers of spindle 63 and pin 86 now passes to the opposite side of the vector 102 between the center of pressure of the cam follower and the cam. This oscillates the follower 87 in the opposite direction. In each position, the vector of pressure is on the outside of the center of the cam and this holds the cam follower in position.

On the forward end of pickup shaft 96 is finger 106 extending transversely thereto. On the end of finger 106 adjacent shaft 96 is rotatably mounted roller 107 which has a hyperbolic contour in elevation and receives the line (not shown) during the pickup motion and feeds the line on to the spool 26 in proper fashion. Outwardly of roller 107 the finger is formed in a point having an arcuate inner face 108 which is complementary to the outside diameter of spool ramp 117.

Spool 26 is threaded on the forward face of shuttle-rod 66, although it is not in direct driving engagement therewith. The central portion of spool 26 is formed with a neck 111 in which the line is wound. Flange 112 on the rear of spool 26 has a recess 113 on its rear face and is further formed with a non-circular socket 114, here shown as being hexagonal. The forward flange 116 of spool 26 is formed with a ramp 117 toward which the point 108 of pickup finger 106 comes in close proximity in the pickup position. Because of this close proximity, the finger 106 fits under the line and picks it up on the finger and moves it into position on the roller 107.

The forward face 121 of flange 116 is likewise recessed and located in said recess in line holder 122, of springy material bearing against the face of recess 121. A hole 123 is formed in flange 116. When the reel is stored between uses, or the spool 26 is stored, the end of the line is threaded through hole 123 and slipped under the line holder 122 thereby preventing unwinding of the line between uses.

The central bore of spool 26 fits over spool collar 126 and is in non-rotative engagement therewith by reason of the fact that flange 127 on the rearward end of collar 126 is non-circular and complementary to the socket 114 in the rear face of spool 26. A groove 128 is formed on the barrel portion of collar 126. Spool 26 carries a retainer 131 in keyway 132, said retainer 131 being of a springy material having a radial offset 133 fixed by means of screw 134 to recess 113 in the rear flange 112 of spool 26. Retainer 131 extends through keyway 132 and has a finger grip 136 at the forward face located within front recess 121. Detent 137 in the central portion of retainer 131 fits into groove 128. Thus normally the spool 26 is held on collar 126 by reason of detent 137 fitting into groove 128, but when it is desired to remove the spool the finger grip 136 is pushed outwardly thereby pulling the detent 137 out of the groove 128 and permitting the spool to be slipped off the collar 126.

Shuttle rod 66 has fixed adjacent the front end drag click gear 141 which fits in recess 113 in spool 26. Pivoted to spool 26 by means of pin 142 is drag click dog 143 which is biased into engagement with gear 141 by means of spring 144. Turning of spool 26 relative to shuttle rod 66—i.e. relative to the reel, thereby indicating line is being pulled out by a fish—causes a clicking noise which makes the user aware of the fact that the turning movement is being accomplished. This clicking noise is caused by dog 143 and gear 141.

Collar 126 is part of the brake structure of the reel. It receives with a sliding fit pressure collar 146 which is drivingly connected to rod 66 by reason of the fact that the central hole in pressure collar 146 is non-circular and receives non-circular key 147 on the forward face of shuttle rod 66. Gear 141 is fixed for rotation with shuttle rod 66. On the forward end of shuttle rod 66 is nut assembly 148 consisting of a hollow nut 149 having a knurled end 151 and containing interiorly a threaded member 152 held by means of pin 153 from rotation relative to member 149, which threaded member 152 is in threaded engagement with the forward end of shuttle rod 66. Nut 149 is closed off at the end opposite end 151 by base 154 fixed thereto. Between threaded member 152 and base 154 of nut 149 is a tension washer 156 of synthetic rubber or rubber or other resilient material. When nut 149 is turned by gripping the knurled portion 151, the nut 151 is moved endwise relative to rod 66 toward base 154, thereby adjusting the pressure exerted by base 154 against pressure collar 146 which, in turn, bears against the base of spool collar 126 and, in turn, against drag click gear 141. It will be noted that the adjustment of nut 149 controls the resistance to rotation of pressure collar 146 relative to spool collar 126. Since pressure collar 146 is fixed against rotation by driving connection to shuttle rod 66 and spool collar 126 is fixed for rotation with spool 111, nut 149 adjusts the resistance to unwinding of spool 111 when a pulling force is exerted on the line. When spool 111 is rotating gear 141 and dog 143 produce a clicking noise.

In use, the reel may be manipulated in conventional manner except that no separate manual switching of the pickup finger 106 is required. In casting the handle 33 is turned to open position (as in FIGS. 1 and 3) which projects the shuttle rod 66 forwardly and exposes the spool 26 outside cup 24 and, by reason of the action of cam 77 and cam follower 87, retracts pickup finger 106 from proximity to spool ramp 117. This permits free stripping of the line from the spool.

At the end of the casting action, handle 33 is moved from open to closed position and the user's finger applied to the forward face of the spool 26. Once the handle 33 is moved forward, the pickup finger 106 is moved to closed position and this immediately stops stripping of the line regardless of the position of the user's finger. By reason of frictional resistance cam 77 is moved to the position of FIG. 6 and cam follower 87 is shifted from the position of FIG. 5 to the position of FIG. 6 which brings the pickup finger 106 into proximity of ramp 117. This insures that the point of the finger 106 will pick up the line and transfer it to the roller 107, thereby holding the line in proper position for winding and also decreasing the wear on the line. If so desired by the user, when there is a strike on the lure anti-reverse lever 49 is manually turned to engage pawl 43 with ratchet 42, preventing reverse turning of spindle 63 or cup 24. Spool 26 is unwound as the line is pulled out and the resistance to unwinding is adjusted by means of nut 149. On the other hand, if there is no strike and it is desired to retrieve the lure, the handle 33 is turned in winding direction, which maintains the follower finger 106 in the position of FIG. 5 and in proximity to the path of movement of ramp 117 during the shuttling of spool and insures that the pickup finger will continue to maintain the line on the roller 107. Winding movement of handle 33 rotates the spindle 66 and cup 24 in a winding direction. Shuttle 67 causes spool 111 to shuttle in and out relative to pickup finger 106 and thus causes level winding of the line on the spool.

When it is desired to remove the spool 111, the pickup finger is moved to the position of FIG. 5 and finger catch 136 is pushed radially outwardly causing detent 137 to release from groove 128 and permitting the spool to be pulled endwise off the reel. It will be noted that the brake nut 148 is of smaller diameter than the hole in spool 111 and hence the brake nut need not be adjusted or removed in order to permit the spool to be withdrawn. If desired, the line may be threaded through hole 123 and slipped into engagement with line holder 122, thereby preventing unwinding during the storage of the spool.

Although the foregoing invention has been described in some detail by way of illustration and example for purposes of clarity of understanding, it is understood that certain changes and modifications may be practiced within the spirit of the invention and scope of the appended claims.

What is claimed is:

1. In a fishing reel having a housing, a rod, non-rotatively mounted in said housing and threaded on its outer end, and a line spool formed with a central aperture rotatable relative to said rod and said housing, the improvement which comprises an adjustable brake for said spool; said improvement comprising an abutment on said rod; a spool collar formed with a first sleeve axially slidable fitting within said central aperture and end wall rotatable with and slidable relative to said spool and bearing against said abutment, a pressure collar non-rotative relative to said rod formed with a second sleeve rotatable within said first sleeve and a bottom wall bearing against said end wall; a hollow rod threaded on said outer end of said nut and having a tension washer in the inside of said nut and an annular base interposed between said tension washer and said bottom wall, said nut having a flange closing off the ends of said first and second sleeves; said nut extending externally of said spool, said nut, spool collar, pressure collar, tension washer and base being removable from said rod as a unit, whereby upon tightening said nut relative to said rod, said tension washer is compressed against said base and said base against said bottom wall to increase frictional forces retarding rotation of said spool relative to said rod and housing, means for restraining axial movement of said spool relative to said spool collar.

2. A reel according to claim 1, which further comprises line retainer means mounted on an outer face of said spool, said retainer means comprising a resilient member fixed to said spool at one end and having its opposite end biased toward said spool whereby line may be caught under said member to retain said line against unwinding during storage.

References Cited by the Examiner
UNITED STATES PATENTS

| | | | |
|---|---|---|---|
| 2,731,214 | 1/56 | Bogar | 242—84.2 |
| 2,758,801 | 8/56 | Bonanno | 242—84.21 |
| 2,773,655 | 12/56 | Mandolf | 242—84.21 |

FOREIGN PATENTS

| | | |
|---|---|---|
| 961,023 | 11/49 | France. |
| 1,008,291 | 2/52 | France. |
| 1,212,063 | 10/59 | France. |

MERVIN STEIN, *Primary Examiner.*